(12) United States Patent
Martin et al.

(10) Patent No.: US 7,819,332 B2
(45) Date of Patent: Oct. 26, 2010

(54) DEVICE FOR UNCOUPLING THE OIL FLOW THROUGH A RADIATOR

(75) Inventors: Hans-Joachim Martin, Kressbronn (DE); Anton Fritzer, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 448 days.

(21) Appl. No.: 12/067,354

(22) PCT Filed: Sep. 27, 2006

(86) PCT No.: PCT/EP2006/009382

§ 371 (c)(1),
(2), (4) Date: Mar. 19, 2008

(87) PCT Pub. No.: WO2007/036354

PCT Pub. Date: Apr. 5, 2007

(65) Prior Publication Data

US 2008/0202450 A1   Aug. 28, 2008

(30) Foreign Application Priority Data

Sep. 29, 2005   (DE) .................. 10 2005 046 635

(51) Int. Cl.
*F01P 7/02* (2006.01)
*G05D 23/02* (2006.01)
(52) U.S. Cl. ................ 236/34.5; 236/93 R; 236/101 A; 236/101 D
(58) Field of Classification Search ................ 236/34.5, 236/93 R, 101 R, 101 A, 101 D
See application file for complete search history.

(56) References Cited

U.S. PATENT DOCUMENTS

| | | | |
|---|---|---|---|
| 2,516,390 A | 7/1950 | Jensen | |
| 3,404,837 A | 10/1968 | James | |
| 3,768,731 A * | 10/1973 | Lavado | ..................... 236/93 R |
| 3,913,831 A * | 10/1975 | Talak | ......................... 236/34.5 |
| 4,190,198 A | 2/1980 | Casuga et al. | |
| 4,344,564 A | 8/1982 | Magnuson | |
| 4,669,532 A | 6/1987 | Tejima et al. | |
| 5,803,354 A * | 9/1998 | Benedict | ..................... 236/12.2 |
| 5,890,509 A | 4/1999 | Becker et al. | |
| 5,960,872 A | 10/1999 | Huemer et al. | |

(Continued)

FOREIGN PATENT DOCUMENTS

| | | |
|---|---|---|
| DE | 197 50 814 A1 | 6/1999 |
| EP | 0 787 929 A2 | 8/1997 |

*Primary Examiner*—Marc E Norman
(74) *Attorney, Agent, or Firm*—Davis & Bujold, P.L.L.C.

(57) ABSTRACT

A bypass valve for blocking oil flow through a radiator from a transmission with low oil temperatures includes an oil supply from the radiator, an oil supply, via a bypass line, an oil outlet and a valve unit arranged inside the valve housing. The valve unit includes a compression spring and a heat sensitive element, which move depending on the oil temperature such that when the temperature falls below a threshold value, the oil supply from the radiator is closed and the supply, via a bypass line, is opened. When the oil temperature rises above the threshold value, the oil supply from the radiator is opened and the supply, via the bypass line, is closed. The valve unit can be axially moved against the force of the compression spring, when a predefined oil pressure is reached, thus opening the supply, via the bypass line.

6 Claims, 2 Drawing Sheets

U.S. PATENT DOCUMENTS 6,182,749 B1 2/2001 Brost et al.
6,253,837 B1 7/2001 Seiler et al.
2004/0204281 A1 10/2004 Wakayama
2004/0232249 A1* 11/2004 Brown et al. ............... 236/34.5

* cited by examiner

DEVICE FOR UNCOUPLING THE OIL FLOW THROUGH A RADIATOR

This application is a national stage completion of PCT/EP2006/009382 filed Sep. 27, 2006, which claims priority from German Application Serial No. 10 2005 046 635.4 filed Sep. 29, 2005.

FIELD OF THE INVENTION

The present invention relates to a device for uncoupling the oil flow through a radiator, in particular a radiator for a transmission, at low temperatures.

BACKGROUND OF THE INVENTION

With oil temperatures below ~80° C., for example, it is advantageous if the oil flow bypasses the radiator so that the transmission reaches the operating temperature faster. In this way, the efficiency of the transmission is increased. In addition, it is necessary to provide devices to protect the radiator against pressure peaks, which is normally carried out by way of a separate bypass valve.

From U.S. Pat. No. 5,890,509, a bypass valve is known that is arranged in a hydraulic circuit between a torque converter and the lubrication circuit. This valve comprises a valve coil, which acts against the force of a compression spring so that, in the bypass-mode, fluid from the torque converter flows directly into the lubrication circuit without being conveyed through the radiator and/or heat exchanger. In addition, a viscosity-sensitive pressure distributor is provided. This produces pressure in the direction of the force of the compression spring when the temperature rises so that the valve coil is displaced into a cool position, which results in the fluid in the torque converter is conveyed through the heat exchanger.

Furthermore, from US 2004/0204281,A1 a cooling system for the operating fluid of an automatic transmission is known, which comprises a water-cooled oil radiator and an air-cooled oil radiator, which are connected in series, as well as a first bypass valve, such that operating fluid bypasses both coolers when the temperature is T≦T1, where T1 is a predefined threshold value. In addition, a second bypass valve is provided which, in the disengaged state allows the fluid to flow through the water-cooled radiator when the temperature is T≦T2, where T2 is a predefined threshold value.

Moreover, a bypass device for a heat exchanger is known from U.S. Pat. No. 6,253,837 B1, which comprises a bypass valve, such that the oil flow bypasses the radiator when there is a predefined temperature interval. The bypass valve comprises a housing with three openings, wherein one of the openings serves as a valve opening. In addition, a temperature-sensitive actuator is provided in the housing, which is operationally connected to a spring valve, so that the valve opening is opened or closed subject to the temperature. To accomplish this, the valve opening can be connected to the inlet or outlet of the heat exchanger.

The present invention is based on the task of specifying a device for uncoupling the oil flow through a radiator, in particular a radiator for a transmission, that can be manufactured and assembled inexpensively. In addition, the pressure peaks in the supply to the radiator ought to be largely eliminated without requiring a separate bypass valve.

SUMMARY OF THE INVENTION

A bypass valve is proposed as a device for uncoupling the flow of oil from an oil supply to the radiator, a supply that runs via a bypass line, and an oil outlet. The bypass valve comprises a valve unit that can be displaced inside the valve housing against the force of a compression spring that is connected in series. The valve unit also comprises a heat sensitive element that moves inside the valve housing subject to the oil temperature, such that when the temperature falls below a threshold value, the oil supply from the radiator is closed and the supply, via the bypass line, is opened. When the temperature rises above the threshold value, the oil supply from the radiator is opened and the supply, via the bypass line, is closed. The entire valve unit can be displaced axially against the force of the compression spring once the oil pressure has reached a predefined level, thus opening the supply via the bypass line.

Within the framework of a first embodiment of the present invention, a bypass valve is proposed as a device for uncoupling the oil flow, which comprises a spring made of a memory metal alloy as a heat sensitive element that is arranged such that, once a temperature above a predefined threshold value has been reached, the spring displaces a first and a second piston provided inside the valve, accomplishing that the flow, via the bypass line, is closed, and the oil supply from the radiator is opened at the same time. Each of the ends of the spring is operationally connected to a piston, resulting in that at a temperature above a predefined threshold value both pistons are displaced axially by the spring. Thus, at a temperature above the threshold value, the piston facing the supply, via the bypass line, rests against an edge and/or a step bore. At temperatures above the threshold value, the piston facing the supply, via the radiator, rests against another edge and/or a step bore.

At temperatures below the threshold value, the spring is in a slack state, so that according to the present invention, the oil flow from the radiator is conveyed past the radiator via the bypass line when the supply is closed.

According to the present invention, the bypass valve comprises an additional compression spring to protect the radiator against improper pressure peaks. The excess pressure function is ensured in that the supply, via the bypass line, is opened by improper pressure peaks on the input side of the radiator when the complete valve unit is displaced axially against the force of the compression spring. In that way, in addition to the supply via the bypass line, the supply from the radiator is opened as well.

Within the framework of a further embodiment of the present invention, a bypass valve is proposed in which a temperature-dependent bimetallic spiral spring is arranged as a heat sensitive element, where one end of the spring is connected to a first sleeve and the other end of the spring to a second sleeve with the sleeves lying inside one another. Due to the rotary motion that results from a change of temperature in the spiral spring, both sleeves lying inside one another are torsioned against one another so that the corresponding openings are closed and/or opened. Thus, at low temperatures, the supply via a bypass line is opened, and the oil flow from the radiator is closed, and at temperatures that exceed a threshold value, the oil flow from the radiator is opened and the flow via the bypass line is prevented. Moreover, according to the present invention, a lid is provided by way of which the valve unit can be adjusted during assembly in order to balance the spring tolerances.

In order to realize the excess pressure function, an additional compression spring is provided in this embodiment as well. The compression spring is connected in series to the spiral spring, so that improper pressure peaks open the supply, via the bypass line, by causing the entire valve unit to be displaced axially against the force of the compression spring.

The conception, according to the present invention, advantageously eliminates the need for a separate bypass valve to protect the radiator against pressure peaks. In addition, the bypass valve can be manufactured inexpensively and mounted easily.

BRIEF DESCRIPTION OF THE DRAWINGS

The invention will now be described, by way of example, with reference to the accompanying drawings in which.

DETAILED DESCRIPTION OF THE INVENTION

Figure 1:
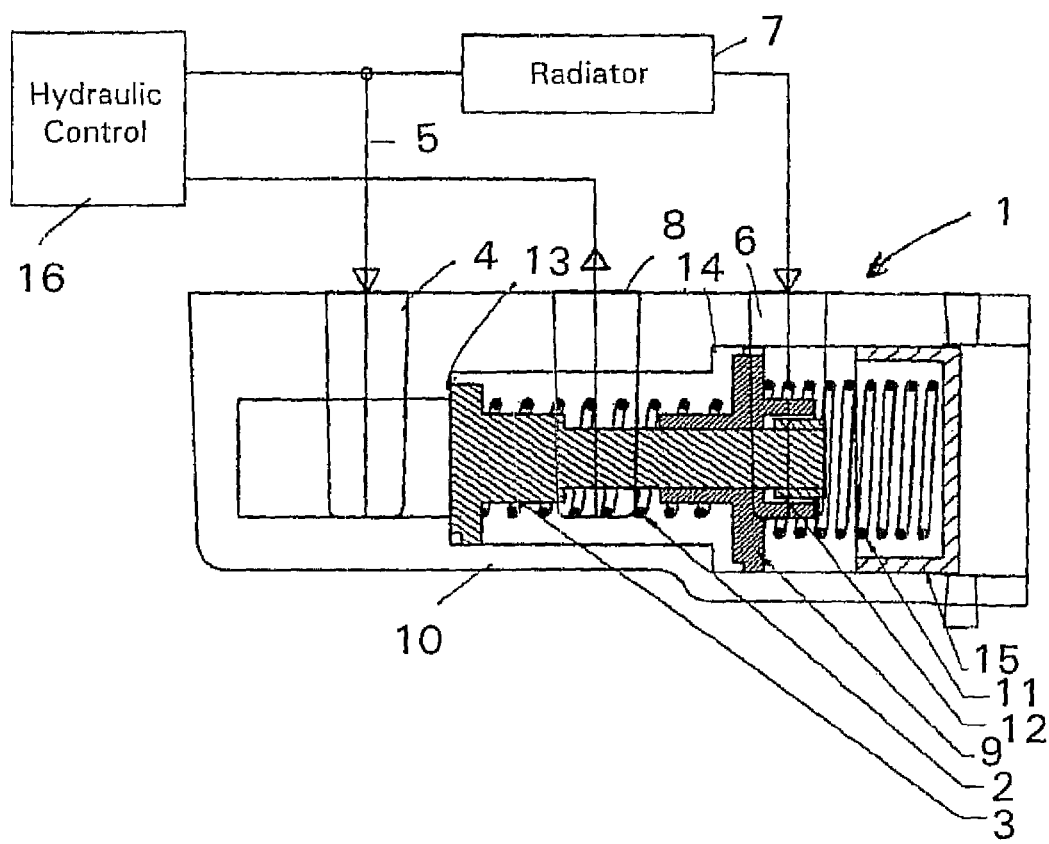
FIG. 1 is a sectional view of a first embodiment of a bypass valve according to the present invention.

FIG. 1 shows a bypass valve 1 in which the heat sensitive element is configured as a spring 2 made of a memory metal alloy. The spring is arranged such that at a temperature above a predefined threshold value, it displaces a piston 3 facing a supply 4 via bypass line 5, which is provided in the valve 1, which results in closing the supply 4, via the bypass line 5, when the piston 3 rests against the edge and/or a step bore 13. At the same time, a piston 9 facing an oil supply 6 from a radiator 7 is displaced in the opposite direction, as a result of which the piston 9 moves away from an edge and/or a step bore 14, which results in an opening the oil supply 6 from the radiator 7. An oil outlet is designated with 8, and a hydraulic control with 16. The piston 3, as well as the spring 2 and the piston 9 form a valve unit that is arranged inside a valve housing 10 so that it can be displaced against the force of a compression spring 11 that is connected in series to the valve unit. As is apparent from FIG. 1, the compression spring 11 is secured axially by a plug 15 and supported by it.

The piston 9 is thus arranged displaceably around the piston 3 and secured axially by way of a sleeve 12 on the side facing the compression spring 11. When the oil pressure, via the bypass line 5, exceeds a threshold value with the closed supply 4, the entire valve unit is displaced axially against the force of the compression spring 11, which opens the supply 4 via the bypass line 5.

Figure 2:
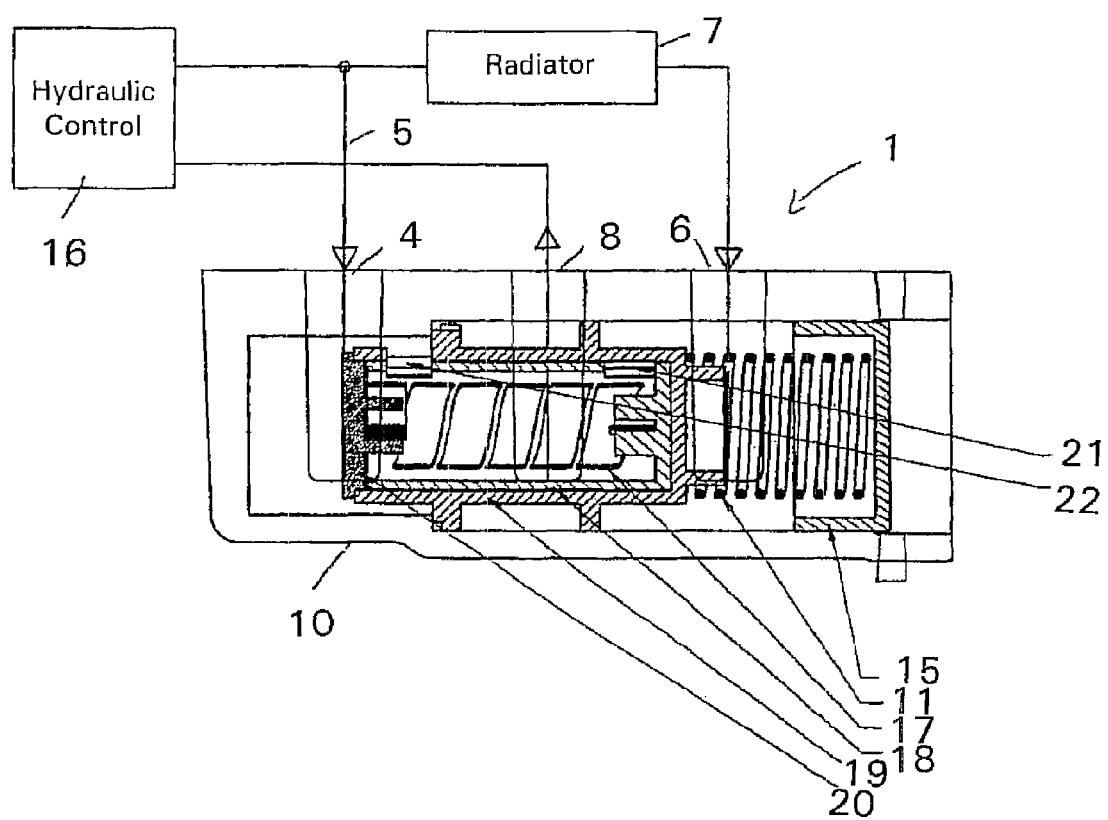
FIG. 2 is a sectional view of an additional embodiment of a bypass valve according to the present invention.

In the embodiment according to FIG. 2, a temperature-dependent bimetallic spiral spring 17 is provided as a heat sensitive element instead of the spring 2 made of memory metal alloy, where one end of the spring 17 is connected to a first sleeve 18 and the other end of the spring 17 to a second sleeve 19. The sleeves 18 and 19 lie inside one another.

A change in temperature in the spring 17 results in a rotary movement of the spring 17 and hence the torsion of the sleeves 18, 19 that lie inside one another against one another so that corresponding openings 21, 22 are closed and/or opened. In this way at low temperatures, the supply 4, via the bypass line is opened and the oil supply 6 from the radiator 7 is closed and, at temperatures that exceed a threshold value, the oil supply 6 from the radiator 7 is opened and the supply 4, via the bypass line 5, is closed. In order to balance the tolerances of the spring 17, the present invention provides for a lid 20 on the side of the spring 17, facing the supply 4 via the bypass line 5, such that the valve unit can be adjusted during assembly.

Naturally, any constructive embodiment, in particular any spatial arrangement of the components of the device for uncoupling the oil flow through a radiator as such, in relation to one another and to the extent that they are technically significant, falls under the scope of protection of the present claims, without influencing the function of the device for uncoupling the oil flow as specified in the claims, even if these embodiments are not explicitly illustrated in the Figures or in the description.

REFERENCE NUMERALS 1 bypass valve
2 spring made of memory metal alloy
3 piston
4 supply via the bypass line
5 bypass line
6 oil supply from radiator
7 radiator
8 oil outlet
9 piston
10 valve housing
11 compression spring
12 sleeve
13 edge/step bore
14 edge/step bore
15 plug
16 hydraulic control
17 bimetallic spiral spring
18 sleeve
19 sleeve
20 lid
21 opening
22 opening

The invention claimed is:

1. A bypass valve (1) for uncoupling oil flow through a radiator at low oil temperatures, with an oil supply (6) from the radiator (7), a supply (4) via a bypass line (5), an oil outlet (8), and a valve unit being displaceable inside a valve housing (10) against a force of a compression spring (11) that is connected in series, the bypass valve (1) comprising a heat sensitive element (2) that moves inside the valve housing (10) subject to an oil temperature such that, at oil temperatures below a threshold value, the oil supply (6) from the radiator (7) is closed and the supply (4), via a bypass line (5), is opened as a result of which, at temperatures above the threshold value, the oil supply (6) from the radiator (7) is opened and the supply (4), via the bypass line (5), is closed resulting in that, once a predefined oil pressure is reached, the entire valve unit is displaced axially against the force of the compression spring (11), as a result of which the supply (4), via the bypass line (5), is opened, the heat sensitive element is a spring (2) made of a memory metal alloy, where respective ends of the spring (2) are operationally connected to a piston (3, 11), resulting in that at a temperature above a predefined threshold value, both pistons (3, 11) are displaced by the spring (2), which closes the supply (4), via the bypass line (5), and opens the oil supply (6) from the radiator (7), and at a temperature below the threshold value the spring (2) is in a relaxed state, so that when the supply (6) from the radiator (7) is closed, and the oil flow is conducted past the radiator (7) via the bypass line (5).

2. The bypass valve (1) for uncoupling the oil flow through a radiator according to claim 1, wherein at the temperature above the threshold value, a piston (3) facing the supply (4), via the bypass line (5), abuts against a step bore (13), and at the temperatures below the threshold value, a piston (3) facing the oil supply (6) rests against a step bore (13).

3. The bypass valve (1) for uncoupling the oil flow through a radiator according to claim 1, wherein a piston (9) is displaceably arranged around an other piston (3) and secured axially by way of a sleeve (12) on a side of the piston (9) facing the compression spring (11).

4. A bypass valve (1) for uncoupling an oil flow through a radiator (7) for a transmission, at low oil temperatures, the bypass valve (1) includes an oil supply (6) from the radiator (7), a supply (4), via a bypass line (5), and an oil outlet (8), and a valve unit, which is displaceably arranged inside a valve housing (10) against a force of a compression spring (11) connected in series, a heat sensitive element (2) moves inside the valve housing (10) subject to an oil temperature such that, at oil temperatures below a threshold value, the oil supply (6) from the radiator (7) is closed and the supply (4), via a bypass line (5), is opened as a result of which, at a temperature above the threshold value, the oil supply (6) from the radiator (7) is opened and the supply (4), via the bypass line (5), is closed resulting in that once a predefined oil pressure is reached, the valve unit is displaceable axially against the force of the compression spring (11) which causes the supply (4), via a bypass line (5), to open, and where the heat sensitive element is a spiral spring (17) made of a bimetal, where one end of the spiral spring (17) is connected to a first sleeve (18) and an other end of the spiral spring (17) is connected to a second sleeve (19), with the first and the second sleeves (18, 19) lying inside one another, so that rotary movement resulting from a change in temperature in the spiral spring (17) causes the first and the second sleeves (18, 19), lying inside one another, to be torsioned against one another, causing corresponding openings (21, 22) to one of close and to open, so that at temperatures below a threshold value, the oil supply (6) from the radiator (7) is closed and the supply (4), via the bypass line (5), is opened, and at temperatures above the threshold value, the oil supply (6) from the radiator (7) is opened and the supply (4), via the bypass line (5), is closed.

5. The bypass valve (1) for uncoupling the oil flow through a radiator according to claim 4, wherein a lid (20) is provided on a side of the spiral spring (17) facing the supply (4), via the bypass line (5). in order to balance tolerances of the spiral spring (17).

6. A bypass valve (1) for directing oil flow, the bypass valve (1) comprising:

a first inlet (6) coupled to a radiator (7), which is coupled to a hydraulic consumer (16) enabling oil flow from the hydraulic consumer (16) through the radiator (7) to the bypass valve (1);

a second inlet (4) coupled to the hydraulic consumer (16) enabling a bypass oil flow from the hydraulic consumer (16) to the bypass valve, bypassing the radiator (7);

an outlet (8) coupled to the hydraulic consumer (16) enabling oil to flow from the bypass valve (1) to the hydraulic consumer (16);

a valve unit being located within a housing (10) bypass valve (1) and including a heat sensitive element (2) which extends between and communicates with a first piston (3) and a second piston (9), and a compression spring (11) communicates with the second piston (9) and axially biases the second piston (9) toward the first piston (3);

the heat sensitive element (2), at a temperature below a threshold temperature value, aligns the valve unit to prevent oil flow through the first inlet (6) and allow oil flow through the second inlet (4) and out the outlet (8); and the heat sensitive element (2), at a temperature above the temperature threshold value, aligns the valve unit to prevent oil flow through the second inlet (4) and allow oil flow through the first inlet (6) and out the outlet (8), if an oil pressure at the second inlet (4) is greater than a pressure threshold value, when the second inlet is closed the valve unit is biased toward the compression spring (11) to open the second inlet (4).

* * * * *